United States Patent [19]

Croissant

[11] 4,060,270
[45] Nov. 29, 1977

[54] DEVICE FOR STOWING AWAY A SPARE-WHEEL ON AN AUTOMOBILE VEHICLE

[75] Inventor: Jean Croissant, Freneuse, France
[73] Assignee: Automobiles Peugeot, Paris, France
[21] Appl. No.: 698,503
[22] Filed: June 22, 1976
[30] Foreign Application Priority Data
July 7, 1975 France .................... 75.21251
[51] Int. Cl.² .................................... B60P 3/22
[52] U.S. Cl. .................... 296/37.2; 224/42.04
[58] Field of Search .............. 296/37.2; 224/42.04
[56] References Cited
U.S. PATENT DOCUMENTS
2,131,746 10/1938 Morrison .................. 296/37.2
3,642,296 2/1972 Froumajou .................. 296/37.2

*Primary Examiner*—Philip Goodman
*Attorney, Agent, or Firm*—Burns, Doane, Swecker & Mathis

[57] ABSTRACT

The device ensures in the case of a shock on the rear of the vehicle the withdrawal of the spare-wheel under the fuel tank without this substantially affecting the capacity of the tank.

The spare-wheel is carried by a basket mounted on a support to pivot about a first axis. The support is mounted under the floor of the vehicle to pivot about a second axis and is normally maintained in position by rivets or pins. The second axis is placed nearer the center of the vehicle than the first axis and at a higher level.

10 Claims, 7 Drawing Figures

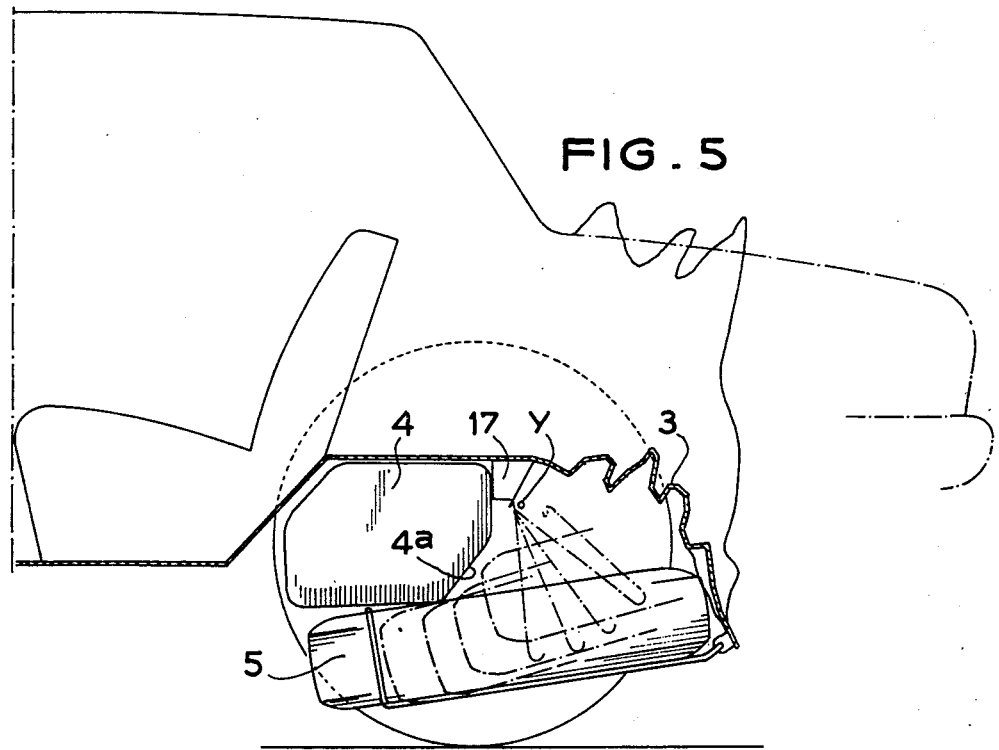
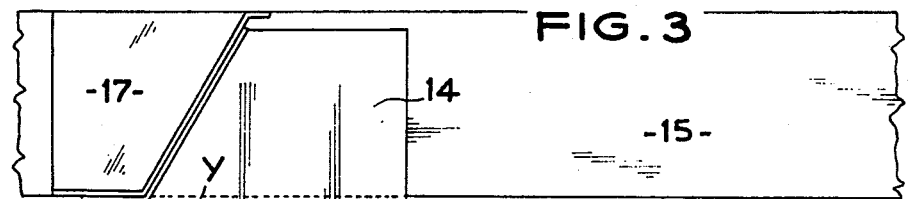
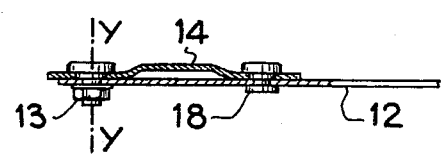

DEVICE FOR STOWING AWAY A SPARE-WHEEL ON AN AUTOMOBILE VEHICLE

The present invention relates to a device for maintaining a spare-wheel under the floor of an automobile vehicle.

It is current practice to dispose the fuel tank and the spare-wheel under the floor of the luggage boot or compartment. This corresponds to optimum utilization of the available space and good permanent accessibility of the spare-wheel.

Moreover, it is known that in order to limit the effects of a serious accident on the occupants of the vehicle, present-day vehicles are designed to permit a maximum absorption of the kinetic energy produced upon shock, by a crushing of the front and rear end parts so as to preserve the centre part, that is to say the compartment containing the passengers. It can therefore occur, during a serious accident, that the tank is subjected to the effects of the shock, either directly, if it is too near to the end of the vehicle, or through the spare-wheel if the latter is located roughly in the same horizontal plane as the tank. There is consequently a serious risk of deformation of the tank which might result in the rupture of the latter and the escape of fuel. This is particularly dangerous since it increases the risk of fire.

French Pat. No. 69-40,339 has already proposed an arrangement which constrains the spare-wheel to slide under the tank in the case of a violent shock. However, the drawback of this arrangement is that it limits the capacity of the tank.

An object of the present invention is to avoid this drawback while retaining the same advantages as concerns safety.

According to the invention there is provided a device for stowing away a spare-wheel under the floor of a vehicle, comprising a basket mounted to be pivotable about a transverse axis on at least one support mounted under the floor, wherein the support is mounted under the floor to pivot about a second transverse axis located with respect to the first axis toward the centre of the vehicle and at a higher level, there being provided connecting means between the floor and the support for holding the support stationary in the normal operation.

The support preferably comprises two links connected to the floor of the vehicle and to the basket by two parallel pivot pins.

The connecting means between the support and the floor may be conveniently rivets or pins of plastics material or the like which shear upon application of a predetermined force thereon.

By way of a modification, the connecting means may also comprise tie rods connecting the lower end of the support to a point of the body located under the floor in the vicinity of the rear part of the vehicle.

Two embodiments of the invention will be described with reference to the accompanying drawings, in which:

FIGS. 3 and 4 are detail views to an enlarged scale, FIG. 4 being a sectional view taken on line 4—of FIG. 3;

FIG. 5 is a view similar to FIG. 4 after the crushing of the rear part subsequent to a shock on the vehicle;

Figure 1:
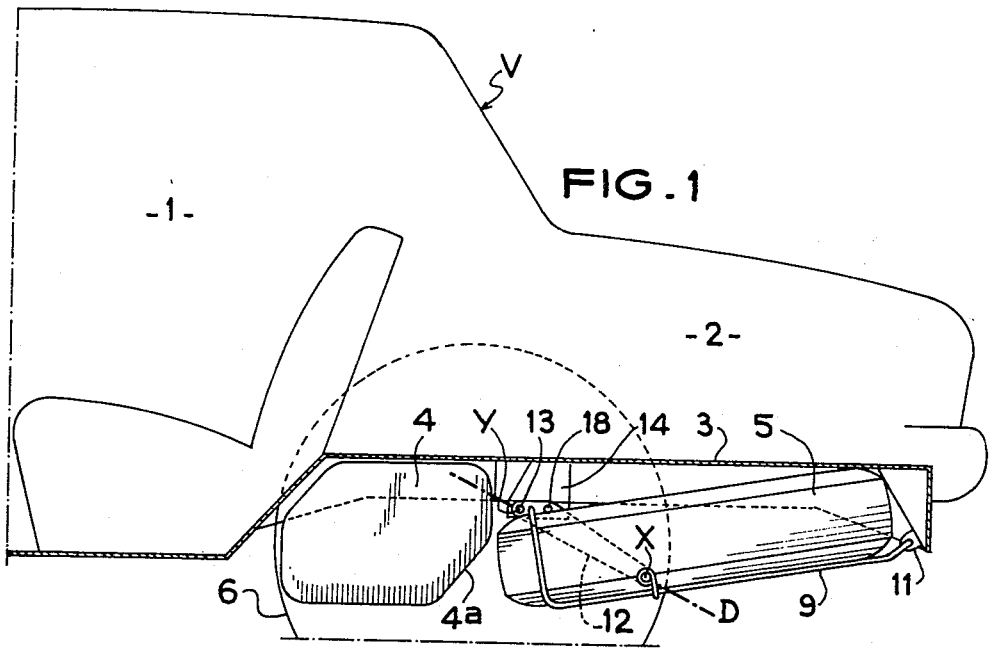
FIG. 1 is a diagrammatic longitudinal sectional view of the rear part of a vehicle arranged in accordance with the invention.

There have been shown in the drawing the rear part of a vehicle V having an engine, a front-wheel drive and a rear luggage boot or compartment. This vehicle comprises a passenger compartment 1 and a luggage boot or compartment 2 under the floor 3 of which there are disposed a fuel tank 4 and a spare wheel 5. The tank has preferably an inclined wall 4a in its rear part.

Figure 2:
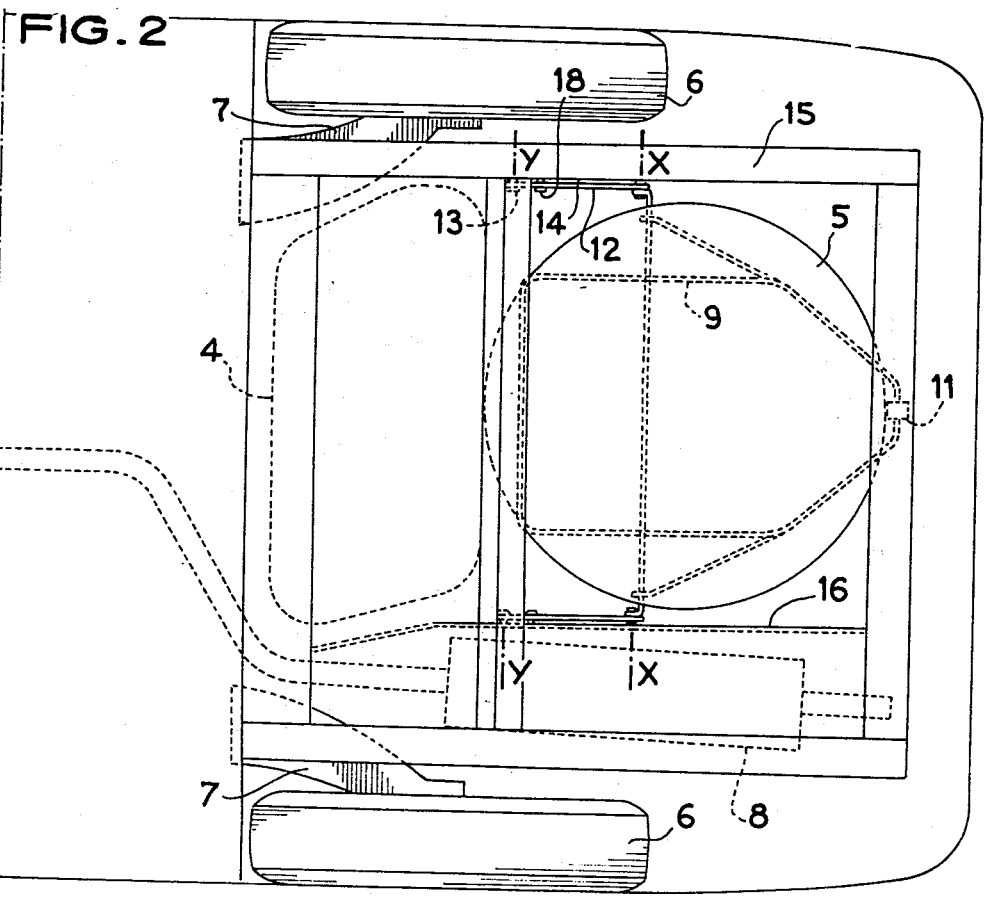
FIG. 2 is a diagrammatic plan view of the same part of the vehicle.

Also shown in the drawing are rear wheels 6 mounted on suspension arms 7 pivoted to the body of the vehicle, and an exhaust pipe 8 (FIG. 2).

The tank 4 is placed as far forward as possible between the rear wheels 6 and preferably in such manner as to avoid extending rearwardly of the latter. Its shape in plan is such that it occupies the available space between a wheel 6 and its suspension arm 7 and the exhaust pipe 8. Its shape in plan is roughly that of a parallelogram whose corners are radiused.

The spare-wheel 6 is disposed in a basket 9 hooked to the rear by a conventional locking device 11 which may be opened, for example, from inside the luggage boot 2 or from inside the compartment 1.

The basket 9 is mounted to pivot about a transverse axis X—X at the lower end of two links 12 which are mounted at their other end to pivot about bolts 13 having a common transverse axis Y—Y which is located, with respect to the axis X—X, toward the centre of the vehicle and at a higher level (FIG. 3).

As viewed in FIG. 1, the arrangement is such that the straight line D interconnecting the axis X—X and Y—Y is roughly perpendicular to the inclined wall 4a of the tank. Moreover, the distance between the two axes is such as to allow the wheel to withdraw under the tank, taking into account the thickness of the wheel, as will be described hereinafter.

The bolts 13 are each carried by a gusset plate 14. One of these gusset plates is fixed to a longitudinal member 15 and the other gusset plate is fixed to a heat screen sheet 16 disposed along the exhaust pipe 8. These gusset plates 14 are in abutting relation to a cross member 17 (FIG. 3).

The links 12 have an angular shape, the axes X—X and Y—Y being located in the vicinity of the two angles of the triangle which are the greatest distance apart. The links 12 are normally held stationary by rivets 18, for example of plastics material, which are adapted to rupture under application of a predetermined force thereon and are placed in the vicinity of the third angle of the triangle (FIGS. 3 and 4).

If the vehicle arranged in this way receives a large shock from the rear, the sheets defining the luggage boot or compartment become crushed and absorb a large amount of energy. Simultaneously, the spare-wheel 5 is urged forwardly and the links 12, owing to their initial orientation, tend to swing downwardly about the bolts 13 after rupture of the rivets 18.

The movement of the links 12 has for effect to shift the spare-wheel 5 downwardly as shown in FIG. 5 so that the wheel passes under the tank 4. Bearing in mind the orientation of the straight line D through the axes X—X and Y—Y with respect to the inclined wall 4a, the initial displacement of the wheel occurs roughly in a direction parallel to the inclined wall 4a which constitutes the most favourable condition.

The arrangement according to the invention therefore attains the object of the invention, since the path travelled through by the spare-wheel avoids a crushing of the fuel tank with no necessity to reduce the capacity of the tank in a substantial manner. The means employed are very simple, reliable and of moderate cost.

Figure 6:
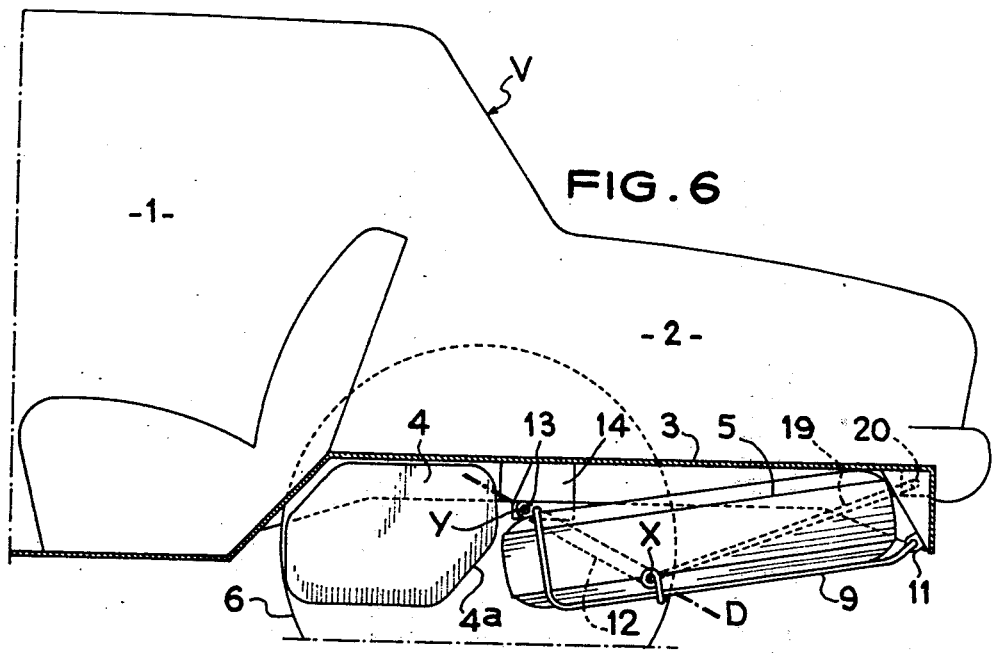
FIGS. 6 and 7 are views similar to FIGS. 1 and 2 of a modification of the invention.
Figure 7:
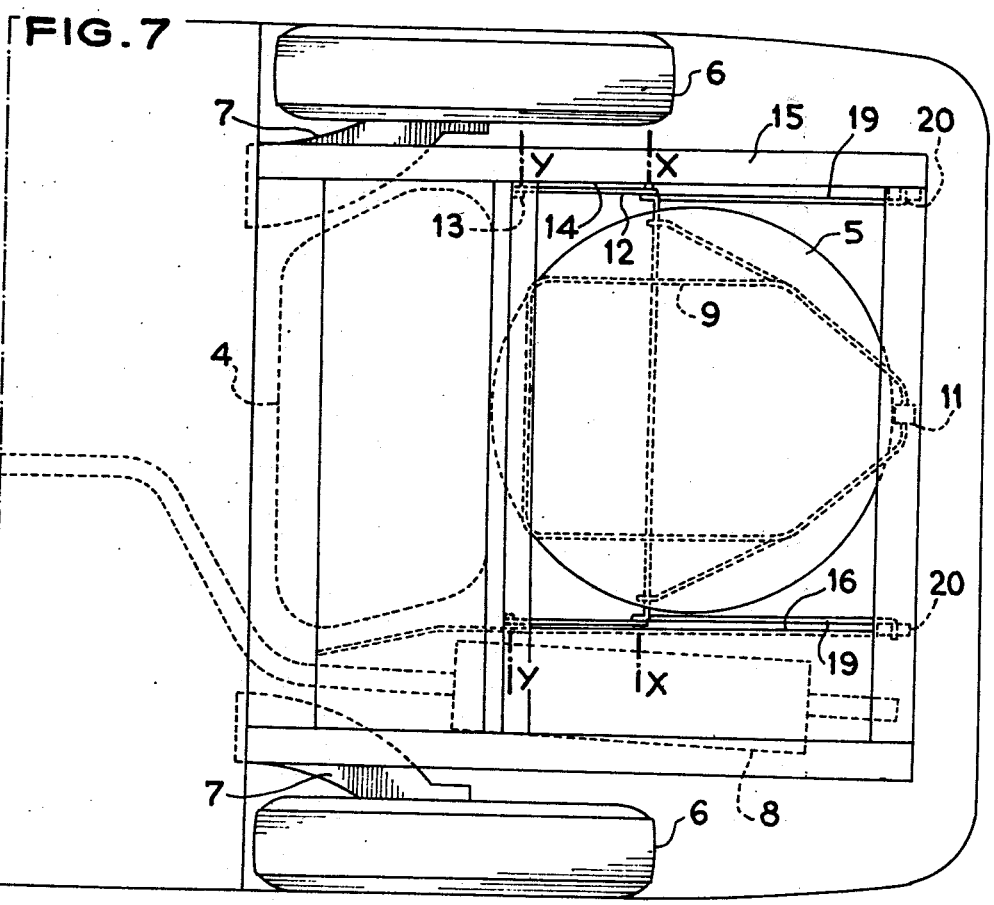

The same results are obtained with the modification shown in FIGS. 6 and 7 in which the links 12 are also connected to the floor 3 of the vehicle and to the basket 9 to pivot about two parallel axes X—X and Y—Y but are, on the other hand, normally held stationary by ties 19 disposed in planes substantially parallel to the longitudinal axis of the vehicle. Each tie 19, constituted by a rod or even a cable, connects the lower end of the corresponding link 12 to a point 20 of the body located under the floor 3 in the vicinity of the rear part of the vehicle.

If the rear or the vehicle is crushed, the tie connecting points 20 move forwardly and the links 12 are no longer retained. The forward movement of the spare-wheel 5 is therefore accompanied by a downward movement owing to the swinging of the links 12 about the axis Y—Y.

Having now described my invention what I claim as new and desire to secure by Letters Patent:

1. A device for stowing away a spare-wheel adjacent an end of a vehicle and comprising, in combination with a floor of the vehicle and a fuel tank carried under the floor, support means mounted under the floor, a basket for carrying and locating the spare-wheel between the tank and said end of the vehicle and mounted on the support means to be pivotable about a first axis extending transversely of the vehicle, the support means being mounted under the floor to pivot about a second axis extending transversely of the vehicle and located with respect to the first axis toward the centre of the vehicle longitudinally of the vehicle and at a higher level than the first axis, and releasable connecting means between the floor and the support means for holding the support means stationary in normal operation of the device and capable of being released in the event of an accident producing an impact capable of displacing the spare-wheel in a direction from said end toward said centre of the vehicle, the support having such position relative to the tank and the first axis and second axis being spaced apart a distance which is such that, upon release of the connecting means, the support means are capable of swinging about the second axis downwardly and toward the centre of the vehicle longitudinally of the vehicle to constrain the basket to move the spare-wheel toward a position under the tank.

2. A device as claimed in claim 1, wherein the support means comprise two links each connected to the floor and to the basket by two parallel pivot pins.

3. A device as claimed in claim 1, wherein the connecting means comprise at least one member adapted to shear upon application of a predetermined force thereon.

4. A device as claimed in claim 2, wherein the links have a triangular shape, the pivot pins being located in the vicinity of two angles of the triangle which are spaced the greatest distance apart.

5. A device as claimed in claim 4, wherein the connecting means are placed in the vicinity of the third angle of the triangle.

6. A device as claimed in claim 1, wherein the connecting means comprise a tie connecting a lower end of the support means to a region of the floor in the vicinity of the rear end of the vehicle.

7. A device as claimed in claim 6, wherein the tie is contained in a plane substantially parallel to the longitudinal axis of the vehicle.

8. A device as claimed in claim 6, wherein the tie is a rod.

9. A device as claimed in claim 6, wherein the tank is partly defined by an inclined wall adjacent said end of the vehicle and a straight line through the pivot axes being substantially perpendicular to said inclined wall in the normal position of the support means.

10. A device for stowing away a spare-wheel adjacent an end of a vehicle and comprising, in combination with a floor of the vehicle and a fuel tank which is partly defined by an inclined wall adjacent said end of the vehicle and is carried under the floor, support means mounted under the floor, a basket for carrying and locating the spare-wheel between the tank and said end of the vehicle and mounted on the support means to be pivotable about a first axis extending transversely of the vehicle, the support means being mounted under the floor to pivot about a second axis extending transversely of the vehicle and located with respect to the first axis toward the centre of the vehicle longitudinally of the vehicle and at a higher level than the first axis, and releasable connecting means between the floor and the support means for holding the support means stationary in normal operation of the device and capable of being released in the event of an accident producing an impact capable of displacing the spare-wheel in a direction from said end toward said centre of the vehicle, the support having such position relative to the tank and the first axis and second axis being spaced apart a distance which is such that, upon release of the connecting means, the support means are capable of swinging about the second axis downwardly and toward the centre of the vehicle longitudinally of the vehicle to constrain the basket to move the spare-wheel toward a position under the tank, a straight line through the pivot axes being substantially perpendicular to said inclined wall in the normal position of the support means.

* * * * *